US012010502B2

(12) United States Patent
Neukam et al.

(10) Patent No.: US 12,010,502 B2
(45) Date of Patent: *Jun. 11, 2024

(54) APPARATUS AND METHOD FOR AUDIO RENDERING EMPLOYING A GEOMETRIC DISTANCE DEFINITION

(71) Applicant: Fraunhofer-Gesellschaft zur Foerderung der angewandten Forschung e.V., Munich (DE)

(72) Inventors: Simone Neukam, Kalchreuth (DE); Jan Plogsties, Fuerth (DE); Max Neuendorf, Nuremberg (DE); Juergen Herre, Erlangen (DE); Bernhard Grill, Rueckersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,432

(22) Filed: Feb. 27, 2023

(65) Prior Publication Data

US 2023/0370799 A1 Nov. 16, 2023

Related U.S. Application Data

(63) Continuation of application No. 16/795,564, filed on Feb. 19, 2020, now Pat. No. 11,632,641, which is a (Continued)

(30) Foreign Application Priority Data

Mar. 26, 2014 (EP) .................................... 14161823
Dec. 8, 2014 (EP) .................................... 14196765

(51) Int. Cl.
*H04S 7/00* (2006.01)
*G10L 19/008* (2013.01)

(Continued)

(52) U.S. Cl.
CPC .............. *H04S 7/30* (2013.01); *G10L 19/008* (2013.01); *G10L 19/08* (2013.01); *G10L 19/20* (2013.01);

(Continued)

(58) Field of Classification Search
CPC . H04S 7/30; H04S 3/008; H04S 7/301; H04S 1/007; H04S 2400/01;

(Continued)

(56) References Cited

U.S. PATENT DOCUMENTS

| | | |
|---|---|---|
| 4,954,837 A | 9/1990 | Baird et al. |
| 5,001,745 A | 3/1991 | Pollock |

(Continued)

FOREIGN PATENT DOCUMENTS

| | | |
|---|---|---|
| CN | 102484762 A | 5/2012 |
| CN | 103650535 A | 3/2014 |

(Continued)

OTHER PUBLICATIONS

Anonymous, "Distance Between Points on the Earth's Surface", Retrieved from the internet: URL:http://www.math.ksu.edu/~dbski/writings/haversine.pdf, retrieved on May 22, 2015, Feb. 13, 2011, 4 pages.

(Continued)

*Primary Examiner* — Yosef K Laekemariam
(74) *Attorney, Agent, or Firm* — Perkins Coie LLP; Michael A. Glenn

(57) ABSTRACT

An apparatus for playing back an audio object associated with a position includes a distance calculator for calculating distances of the position to speakers or for reading the distances of the position to the speakers. The distance calculator is configured to take a solution with a smallest distance. The apparatus is configured to play back the audio object using the speaker corresponding to the solution.

15 Claims, 6 Drawing Sheets

Related U.S. Application Data continuation of application No. 15/274,623, filed on Sep. 23, 2016, now Pat. No. 10,587,977, which is a continuation of application No. PCT/EP2015/054514, filed on Mar. 4, 2015.

(51) Int. Cl.

| | |
|---|---|
| ***G10L 19/08*** | (2013.01) |
| ***G10L 19/20*** | (2013.01) |
| ***H04S 1/00*** | (2006.01) |
| ***H04S 3/00*** | (2006.01) |

(52) U.S. Cl.

CPC .............. *H04S 3/008* (2013.01); *H04S 7/301* (2013.01); *H04S 1/007* (2013.01); *H04S 2400/01* (2013.01); *H04S 2400/03* (2013.01); *H04S 2400/11* (2013.01); *H04S 2420/03* (2013.01)

(58) Field of Classification Search

CPC ............. H04S 2400/03; H04S 2400/11; H04S 2420/03; H04S 1/00; H04S 7/00; G10L 19/008; G10L 19/08; G10L 19/20

See application file for complete search history.

(56) References Cited

U.S. PATENT DOCUMENTS

| | | | | |
|---|---|---|---|---|
| 2003/0107478 | A1 | 6/2003 | Hendricks et al. | |
| 2007/0055516 | A1 | 3/2007 | Kakino et al. | |
| 2009/0192638 | A1* | 7/2009 | Van Leest ................ | H04R 3/12 700/94 |
| 2009/0262946 | A1* | 10/2009 | Dunko .................... | G06F 3/165 381/17 |
| 2011/0013790 | A1 | 1/2011 | Hilpert et al. | |
| 2012/0106744 | A1 | 5/2012 | Kambe | |
| 2012/0113224 | A1 | 5/2012 | Nguyen et al. | |
| 2013/0054377 | A1 | 2/2013 | Krahnstoever et al. | |
| 2014/0119581 | A1 | 5/2014 | Tsingos et al. | |
| 2014/0133682 | A1 | 5/2014 | Chabanne et al. | |
| 2014/0133683 | A1 | 5/2014 | Robinson et al. | |

FOREIGN PATENT DOCUMENTS

| | | | |
|---|---|---|---|
| CN | 103650536 | A | 3/2014 |
| JP | 2003027435 | A | 1/2003 |
| JP | 2003030797 | A | 1/2003 |
| JP | 2003216164 | A | 7/2003 |
| JP | 2010507114 | A | 3/2010 |
| JP | 2013050945 | A | 3/2013 |
| JP | 2014003493 | A | 1/2014 |
| JP | 2014523190 | A | 9/2014 |
| RU | 2321187 | C1 | 3/2008 |
| WO | 2010020788 | A1 | 2/2010 |
| WO | 2012154823 | A1 | 11/2012 |
| WO | 2013006325 | | 1/2013 |
| WO | 2013006325 | A1 | 1/2013 |
| WO | 2013006330 | A2 | 1/2013 |
| WO | 2013108200 | A1 | 7/2013 |
| WO | 2014036085 | A1 | 3/2014 |

OTHER PUBLICATIONS

Ebu, "Tech 3364 Audio Definition Model", Retrieved from the internet: URL: https://tech.ebu.ch/docs/tech/tech3364.pdf, retrieved on Apr. 3, 2014, Jan. 1, 2014, pp. 1-49.

Fueg, Simone, et al., "Design, Coding and Processing of Metadata for Object-Based Interactive Audio", AES Convention 137, 12 pages.

Plogsties, Jan, et al., "Object Interaction Use Cases and Technology", MPEG Meeting, Valencia, Mar. 31-Apr. 4, 2014, No. 33224, 20 pages.

* cited by examiner

APPARATUS AND METHOD FOR AUDIO RENDERING EMPLOYING A GEOMETRIC DISTANCE DEFINITION

CROSS-REFERENCE TO RELATED APPLICATIONS

This application is a continuation of copending U.S. patent application Ser. No. 16/795,564, filed Feb. 19, 2020, which is a continuation of copending U.S. patent application Ser. No. 15/274,623, filed Sep. 23, 2016, which in turn is a continuation of copending International Application No. PCT/EP2015/054514, filed Mar. 4, 2015, which is incorporated herein by reference in its entirety, and additionally claims priority from European Applications Nos. EP 14161823.1, filed Mar. 26, 2014, and EP 14196765.3, filed Dec. 8, 2014, both of which are incorporated herein by reference in their entirety.

The present invention relates to audio signal processing, in particular, to an apparatus and a method for audio rendering, and, more particularly, to an apparatus and a method for audio rendering employing a geometric distance definition.

BACKGROUND OF THE INVENTION

With increasing multimedia content consumption in daily life, the demand for sophisticated multimedia solutions steadily increases. In this context, positioning of audio objects plays an important role. An optimal positioning of audio objects for an existing loudspeaker setup would be desirable.

In the state of the art, audio objects are known. Audio objects may, e.g., be considered as sound tracks with associated metadata. The metadata may, e.g., describe the characteristics of the raw audio data, e.g., the desired playback position or the volume level. An advantage of object-based audio is that a predefined movement can be reproduced by a special rendering process on the playback side in the best way possible for all reproduction loudspeaker layouts.

Geometric metadata can be used to define where an audio object should be rendered, e.g., angles in azimuth or elevation or absolute positions relative to a reference point, e.g., the listener. The metadata is stored or transmitted along with the object audio signals.

In the context of MPEG-H, at the 105th MPEG meeting the audio group reviewed the requirements and timelines of different application standards (MPEG=Moving Picture Experts Group). According to that review, it would be essential to meet certain points in time and specific requirements for a next generation broadcast system. According to that, a system should be able to accept audio objects at the encoder input. Moreover, the system should support signaling, delivery and rendering of audio objects and should enable user control of objects, e.g., for dialog enhancement, alternative language tracks and audio description language.

In the state of the art, different concepts are known. A first concept is reflected sound rendering for object-based audio (see [2]). Snap to speaker location information is included in a metadata definition as useful rendering information. However, in [2], no information is provided how the information is used in the playback process. Moreover, no information is provided how a distance between two positions is determined.

Another concept of the state of the art, system and tools for enhanced 3D audio authoring and rendering is described in [5]. FIG. 6B of document [5] is a diagram illustrating how a "snapping" to a speaker might be algorithmically realized. In detail, according to the document [5] if it is determined to snap the audio object position to a speaker location (see block 665 of FIG. 6B of document [5]), the audio object position will be mapped to a speaker location (see block 670 of FIG. 6B of document [5]), generally the one closest to the intended (x,y,z) position received for the audio object. According to [5], the snapping might be applied to a small group of reproduction speakers and/or to an individual reproduction speaker. However, [5] employs Cartesian (x,y,z) coordinates instead of spherical coordinates. Moreover, the renderer behavior is just described as map audio object position to a speaker location; if the snap flag is one, no detailed description is provided. Furthermore, no details are provided how the closest speaker is determined.

According to another conventional technology, System and Method for Adaptive Audio Signal Generation, Coding and Rendering, described in document [1], metadata information (metadata elements) specify that "one or more sound components are rendered to a speaker feed for playback through a speaker nearest an intended playback location of the sound component, as indicated by the position metadata". However, no information is provided, how the nearest speaker is determined.

In a further conventional technology, audio definition model, described in document [4], a metadata flag is defined called "channelLock". If set to 1, a renderer can lock the object to the nearest channel or speaker, rather than normal rendering. However, no determination of the nearest channel is described.

In another conventional technology, upmixing of object based audio is described (see [3]). Document [3] describes a method for the usage of a distance measure of speakers in a different field of application: Here it is used for upmixing object-based audio material. The rendering system is configured to determine, from an object based audio program (and knowledge of the positions of the speakers to be employed to play the program), the distance between each position of an audio source indicated by the program and the position of each of the speakers. Furthermore, the rendering system of [3] is configured to determine, for each actual source position (e.g., each source position along a source trajectory) indicated by the program, a subset of the full set of speakers (a "primary" subset) consisting of those speakers of the full set which are (or the speaker of the full set which is) closest to the actual source position, where "closest" in this context is defined in some reasonably defined sense. However, no information is provided how the distance should be calculated.

SUMMARY

According to an embodiment, an apparatus for playing back an audio object associated with a position may have: a distance calculator for calculating distances of the position to speakers or for reading the distances of the position to the speakers, wherein the distance calculator is configured to take a solution with a smallest distance, and wherein the apparatus is configured to play back the audio object using the speaker corresponding to the solution.

According to another embodiment, a decoder device may have: a USAC decoder for decoding a bitstream to acquire one or more audio input channels, to acquire one or more input audio objects, to acquire compressed object metadata and to acquire one or more SAOC transport channels, an SAOC decoder for decoding the one or more SAOC transport channels to acquire a group of one or more rendered audio objects, an object metadata decoder, for decoding the compressed object metadata to acquire uncompressed metadata, a format converter for converting the one or more audio input channels to acquire one or more converted channels, and a mixer for mixing the one or more rendered audio objects of the group of one or more rendered audio objects, the one or more input audio objects and the one or more converted channels to acquire one or more decoded audio channels, wherein the object metadata decoder and the mixer together form an apparatus according to one of the preceding claims, wherein the object metadata decoder has the distance calculator of the apparatus according to one of the preceding claims, wherein the distance calculator is configured, for each input audio object of the one or more input audio objects, to calculate distances of the position associated with said input audio object to speakers or for reading the distances of the position associated with said input audio object to the speakers, and to take a solution with a smallest distance, and wherein the mixer is configured to output each input audio object of the one or more input audio objects within one of the one or more decoded audio channels to the speaker corresponding to the solution determined by the distance calculator of the apparatus according to one of the preceding claims for said input audio object.

According to another embodiment, a method for playing back an audio object associated with a position may have the steps of: calculating distances of the position to speakers or reading the distances of the position to the speakers, taking a solution with a smallest distance, and playing back the audio object using the speaker corresponding to the solution.

Another embodiment may have a non-transitory digital storage medium having a computer program stored thereon to perform the method for playing back an audio object associated with a position, the method having the steps of: calculating distances of the position to speakers or reading the distances of the position to the speakers, taking a solution with a smallest distance, and playing back the audio object using the speaker corresponding to the solution, when said computer program is run by a computer.

An apparatus for playing back an audio object associated with a position is provided. The apparatus comprises a distance calculator for calculating distances of the position to speakers or for reading the distances of the position to the speakers. The distance calculator is configured to take a solution with a smallest distance. The apparatus is configured to play back the audio object using the speaker corresponding to the solution.

According to an embodiment, the distance calculator may, e.g., be configured to calculate the distances of the position to the speakers or to read the distances of the position to the speakers only if a closest speaker playout flag (mdae_closestSpeakerPlayout), being received by the apparatus, is enabled. Moreover, the distance calculator may, e.g., be configured to take a solution with a smallest distance only if the closest speaker playout flag (mdae_closestSpeakerPlayout) is enabled. Furthermore, the apparatus may, e.g., be configured to play back the audio object using the speaker corresponding to the solution only of the closest speaker playout flag (mdae_closestSpeakerPlayout) is enabled.

In an embodiment, the apparatus may, e.g., be configured to not conduct any rendering on the audio object, if the closest speaker playout flag (mdae_closestSpeakerPlayout) is enabled.

According to an embodiment, the distance calculator may, e.g., be configured to calculate the distances depending on a distance function which returns a weighted Euclidian distance or a great-arc distance.

In an embodiment, the distance calculator may, e.g., be configured to calculate the distances depending on a distance function which returns weighted absolute differences in azimuth and elevation angles.

According to an embodiment, the distance calculator may, e.g., be configured to calculate the distances depending on a distance function which returns weighted absolute differences to the power p, wherein p is a number. In an embodiment, p may, e.g., be set to p=2.

According to an embodiment, the distance calculator may, e.g., be configured to calculate the distances depending on a distance function which returns a weighted angular difference.

In an embodiment, the distance function may, e.g., be defined according to $$\text{diffAngle}=a\cos(\cos(\text{azDiff})*\cos(\text{elDiff})),$$

wherein azDiff indicates a difference of two azimuth angles, wherein elDiff indicates a difference of two elevation angles, and wherein diffAngle indicates the weighted angular difference.

According to an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=|\beta_1-\beta_2|+|\alpha_1-\alpha_2|$$

$\alpha_1$ indicates an azimuth angle of the position, $\alpha_2$ indicates an azimuth angle of said one of the speakers, $\beta_1$ indicates an elevation angle of the position, and $\beta_2$ indicates an elevation angle of said one of the speakers. Or $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position.

In an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=|\beta_1-\beta_2|+|\alpha_1-\alpha_2|+|r_1-r_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position and $r_2$ indicates a radius of said one of the speakers. Or $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, $r_1$ indicates a radius of said one of the speakers and $r_2$ indicates a radius of the position.

According to an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=b\cdot|\beta_1-\beta_2|+a\cdot|\alpha_1-\alpha_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, a is a first number, and b is a second number. Or $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, a is a first number, and b is a second number.

In an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=b\cdot|\beta_1-\beta_2|+a\cdot|\alpha_1-\alpha_2|+c\cdot|r_1-r_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position, $r_2$ indicates a radius of said one of the speakers, a is a first number, and b is a second number. Or, $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position, $r_1$ indicates a radius of said one of the speakers, and $r_2$ indicates a radius of the position, a is a first number, b is a second number, and c is a third number.

According to an embodiment, a decoder device is provided. The decoder device comprises a USAC decoder for decoding a bitstream to obtain one or more audio input channels, to obtain one or more input audio objects, to obtain compressed object metadata and to obtain one or more SAOC transport channels. Moreover, the decoder device comprises an SAOC decoder for decoding the one or more SAOC transport channels to obtain a group of one or more rendered audio objects. Furthermore, the decoder device comprises an object metadata decoder for decoding the compressed object metadata to obtain uncompressed metadata. Moreover, the decoder device comprises a format converter for converting the one or more audio input channels to obtain one or more converted channels. Furthermore, the decoder device comprises a mixer for mixing the one or more rendered audio objects of the group of one or more rendered audio objects, the one or more input audio objects and the one or more converted channels to obtain one or more decoded audio channels. The object metadata decoder and the mixer together form an apparatus according to one of the above-described embodiments. The object metadata decoder comprises the distance calculator of the apparatus according to one of the above-described embodiments, wherein the distance calculator is configured, for each input audio object of the one or more input audio objects, to calculate distances of the position associated with said input audio object to speakers or for reading the distances of the position associated with said input audio object to the speakers, and to take a solution with a smallest distance. The mixer is configured to output each input audio object of the one or more input audio objects within one of the one or more decoded audio channels to the speaker corresponding to the solution determined by the distance calculator of the apparatus according to one of the above-described embodiments for said input audio object.

A method for playing back an audio object associated with a position, comprising:

Calculating distances of the position to speakers or reading the distances of the position to the speakers.

Taking a solution with a smallest distance. And:

Playing back the audio object using the speaker corresponding to the solution.

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
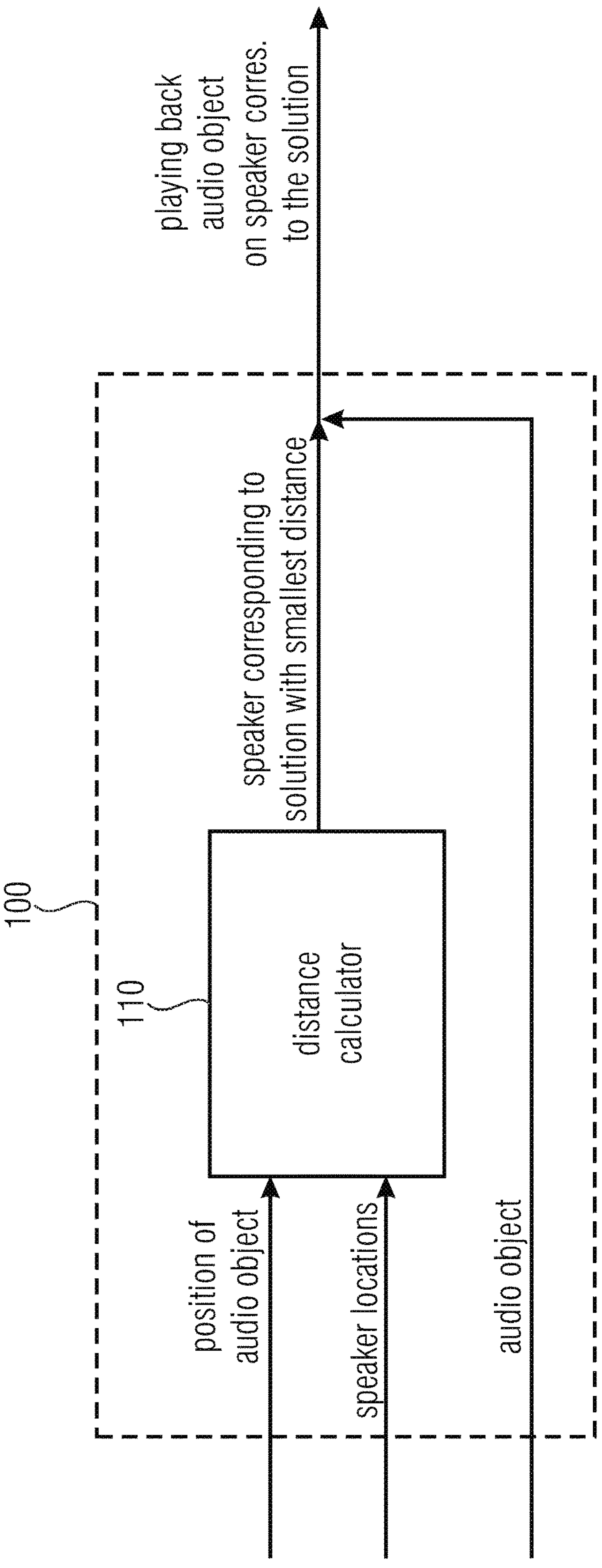
FIG. 1 is an apparatus according to an embodiment.

FIG. 1 illustrates an apparatus 100 for playing back an audio object associated with a position is provided.

The apparatus 100 comprises a distance calculator 110 for calculating distances of the position to speakers or for reading the distances of the position to the speakers. The distance calculator 110 is configured to take a solution with a smallest distance.

The apparatus 100 is configured to play back the audio object using the speaker corresponding to the solution.

For example, for each loudspeaker, a distance between the position (the audio object position) and said loudspeaker (the location of said loudspeaker) is determined.

According to an embodiment, the distance calculator may, e.g., be configured to calculate the distances of the position to the speakers or to read the distances of the position to the speakers only if a closest speaker playout flag (mdae_closestSpeakerPlayout), being received by the apparatus 100, is enabled. Moreover, the distance calculator may, e.g., be configured to take a solution with a smallest distance only if the closest speaker playout flag (mdae_closestSpeakerPlayout) is enabled. Furthermore, the apparatus 100 may, e.g., be configured to play back the audio object using the speaker corresponding to the solution only of the closest speaker playout flag (mdae_closestSpeakerPlayout) is enabled.

In an embodiment, the apparatus 100 may, e.g., be configured to not conduct any rendering on the audio object, if the closest speaker playout flag (mdae_closestSpeakerPlayout) is enabled.

According to an embodiment, the distance calculator may, e.g., be configured to calculate the distances depending on a distance function which returns a weighted Euclidian distance or a great-arc distance.

In an embodiment, the distance calculator may, e.g., be configured to calculate the distances depending on a distance function which returns weighted absolute differences in azimuth and elevation angles.

According to an embodiment, the distance calculator may, e.g., be configured to calculate the distances depending on a distance function which returns weighted absolute differences to the power p, wherein p is a number. In an embodiment, p may, e.g., be set to p=2.

According to an embodiment, the distance calculator may, e.g., be configured to calculate the distances depending on a distance function which returns a weighted angular difference.

In an embodiment, the distance function may, e.g., be defined according to $$\text{diffAngle}=a\cos(\cos(\text{azDiff})*\cos(\text{elDiff})),$$

wherein azDiff indicates a difference of two azimuth angles, wherein elDiff indicates a difference of two elevation angles, and wherein diffAngle indicates the weighted angular difference.

According to an embodiment, the distance calculator may, e.g., be configured to calculate the distances of the position to the speakers, so that each distance of the positon to one of the speakers is calculated according to $$\Delta(P_1,P_2)=|\beta_1-\beta_2|+|\alpha_1-\alpha_2|$$

$\alpha_1$ indicates an azimuth angle of the position, $\alpha_2$ indicates an azimuth angle of said one of the speakers, $\beta_1$ indicates an elevation angle of the position, and $\beta_2$ indicates an elevation angle of said one of the speakers. Or $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position.

In an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=|\beta_1-\beta_2|+|\alpha_1-\alpha_2|+|r_1-r_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position and $r_2$ indicates a radius of said one of the speakers. Or $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, $r_1$ indicates a radius of said one of the speakers and $r_2$ indicates a radius of the position.

According to an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=b\cdot|\beta_1-\beta_2|+a\cdot|\alpha_1-\alpha_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, a is a first number, and b is a second number. Or $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, a is a first number, and b is a second number.

In an embodiment, the distance calculator may, e.g., be configured to calculate the distances of the position to the speakers, so that each distance $\Delta(P_1,P_2)$ of the positon to one of the speakers is calculated according to $$\Delta(P_1,P_2)=b\cdot|\beta_1-\beta_2|+a\cdot|\alpha_1-\alpha_2|+c\cdot|r_1-r_2|$$

$\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position, $r_2$ indicates a radius of said one of the speakers, a is a first number, b is a second number, and c is a third number. Or, $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position, $r_1$ indicates a radius of said one of the speakers, and $r_2$ indicates a radius of the position, a is a first number, b is a second number, and c is a third number.

In the following, embodiments of the present invention are described. The embodiments provide concepts for using a geometric distance definition for audio rendering.

Object metadata can be used to define either:

1) where in space an object should be rendered, or
2) which loudspeaker should be used to play back the object.

If the position of the object indicated in the metadata does not fall on a single speaker, the object renderer would create the output signal based by using multiple loudspeakers and defined panning rules. Panning is suboptimal in terms of localizing sounds or the sound color.

Therefore, it may be desirable by the producer of object based content, to define that a certain sound should come from a single loudspeaker from a certain direction.

It may happen that this loudspeaker does not exist in the users loudspeaker setup. Then a flag is set in the metadata that forces the sound to be played back by the nearest available loudspeaker without rendering.

The invention describes how the closest loudspeaker can be found allowing for some weighting to account for a tolerable deviation from the desired object position.

Figure 2:
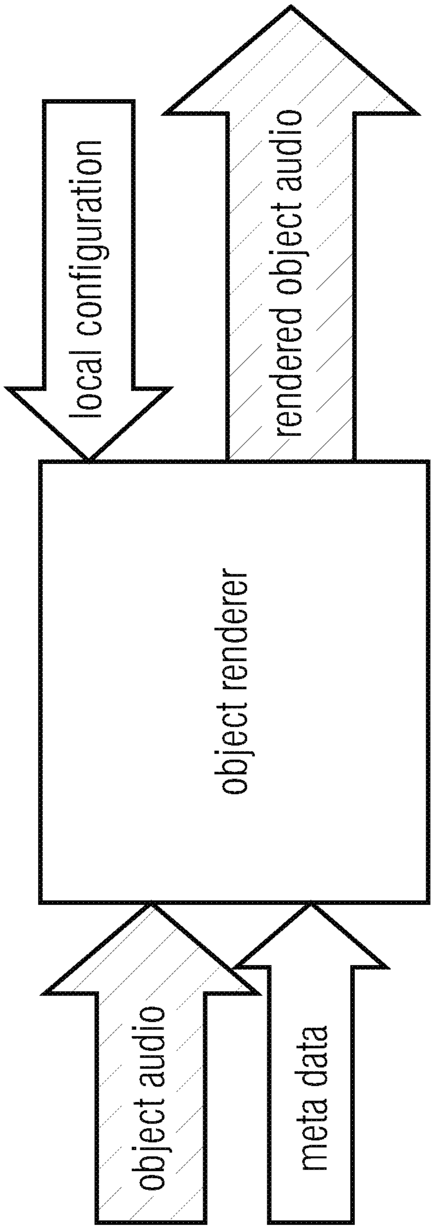
FIG. 2 illustrates an object renderer according to an embodiment.

FIG. 2 illustrates an object renderer according to an embodiment.

In object-based audio formats metadata are stored or transmitted along with object signals. The audio objects are rendered on the playback side using the metadata and information about the playback environment. Such information is e.g. the number of loudspeakers or the size of the screen.

TABLE 1

| Example metadata: | |
|---|---|
| | ObjectID |
| Dynamic OAM | Azimuth |
| | Elevation |
| | Gain |
| | Distance |
| Interactivity | AllowOnOff |
| | AllowPositionInteractivity |
| | AllowGainInteractivity |
| | DefaultOnOff |
| | DefaultGain |
| | InteractivityMinGain |
| | InteractivtiyMaxGain |
| | InteractivityMinAzOffset |
| | InteractivityMaxAzOffset |
| | InteractivityMinElOffset |
| | InteractivityMaxElOffset |
| | InteractivityMinDist |
| | InteractivityMaxDist |
| Playout | IsSpeakerRelatedGroup |
| | SpeakerConfig3D |
| | AzimuthScreenRelated |
| | ElevationScreenRelated |
| | ClosestSpeakerPlayout |
| Content | ContentKind |
| | ContentLanguage |
| Group | GroupID |
| | GroupDescription |
| | GroupNumMembers |
| | GroupMembers |
| | Priority |
| Switch Group | Switch GroupID |
| | SwitchGroupDescription |
| | SwitchGroupDefault |
| | SwitchGroupNumMembers |
| | SwitchGroupMembers |
| Audio Scene | NumGroupsTotal |
| | IsMainScene |
| | NumGroupsPresent |
| | NumSwitchGroups |

For objects geometric metadata can be used to define how they should be rendered, e.g. angles in azimuth or elevation or absolute positions relative to a reference point, e.g. the listener. The renderer calculates loudspeaker signals on the basis of the geometric data and the available speakers and their position.

If an audio-object (audio signal associated with a position in the 3D space, e.g. azimuth, elevation and distance given) should not be rendered to its associated position, but instead played back by a loudspeaker that exists in the local loudspeaker setup, one way would be to define the loudspeaker where the object should be played back by means of metadata.

Nevertheless, there are cases where the producer does not want the object content to be played-back by a specific speaker, but rather by the next available speaker, i.e. the "geometrically nearest" speaker. This allows for a discrete playback without the necessity to define which speaker corresponds to which audio signal or to do rendering between multiple loudspeakers.

Embodiments according to the present invention emerge from the above in the following manner.

Metadata Fields:

| | |
|---|---|
| ClosestSpeakerPlayout | object should be played back by geometrically nearest speaker, no rendering (only for dynamic objects (IsSpeakerRelatedGroup == 0)) |

weighted angular difference, e.g. diffAngle=a cos(cos (azDiff)*cos(elDiff))

Examples for closest speaker calculation are set out below.

If the mdae_closestSpeakerPlayout flag of an audio element group is enabled, the members of the audio element group shall each be played back by the speaker that is nearest to the given position of the audio element. No rendering is applied.

The distance of two positions $P_1$ and $P_2$ in a spherical coordinate system is defined as the absolute difference of their azimuth angles $\alpha$ and elevation angles $\beta$.

$$\Delta(P_1,P_2)=|\beta_1-\beta_2|+|\alpha_1-\alpha_2|+|r_1-r_2|$$

This distance has to be calculated for all known positions $P_1$ to $P_N$ of the N output speakers with respect to the wanted position of the audio element $P_{wanted}$.

The nearest known loudspeaker position is the one, where the distance to the wanted position of the audio element gets minimal $$P_{next}=\min(\Delta(P_{wanted},P_1),\Delta(P_{wanted},P_2), \ldots ,\Delta(P_{wanted},P_N))$$

With this formula, it is possible to add weights to elevation, azimuth and/or radius. In that way it is possible to state that an azimuth deviation should be less tolerable than an elevation deviation by weighting the azimuth deviation by a high number:

TABLE 2

| Syntax of GroupDefinition( ): | | |
|---|---|---|
| **Syntax** | **No. of bits** | **Mnemonic** |
| mdae_GroupDefinition( numGroups ) | | |
| { | | |
| for ( grp = 0; grp < numGroups; grp++ ) { | | |
| mdae_groupID[grp]; | 7 | uimsbf |
| ... | | |
| mdae_groupPriority[grp]; | 3 | uimsbf |
| mdae_closestSpeakerPlayout[grp]; | 1 | bslbf |
| ... | | |
| } | | |
| } | | |
| mdae_closestSpeakerPlayout | This flag defines that the members of the metadata element group should not be rendered but directly be played back by the speakers which are nearest to the geometric position of the members. | |

The remapping is done in an object metadata processor that takes the local loudspeaker setup into account and performs a routing of the signals to the corresponding renderers with specific information by which loudspeaker or from which direction a sound should be rendered.

Figure 3:
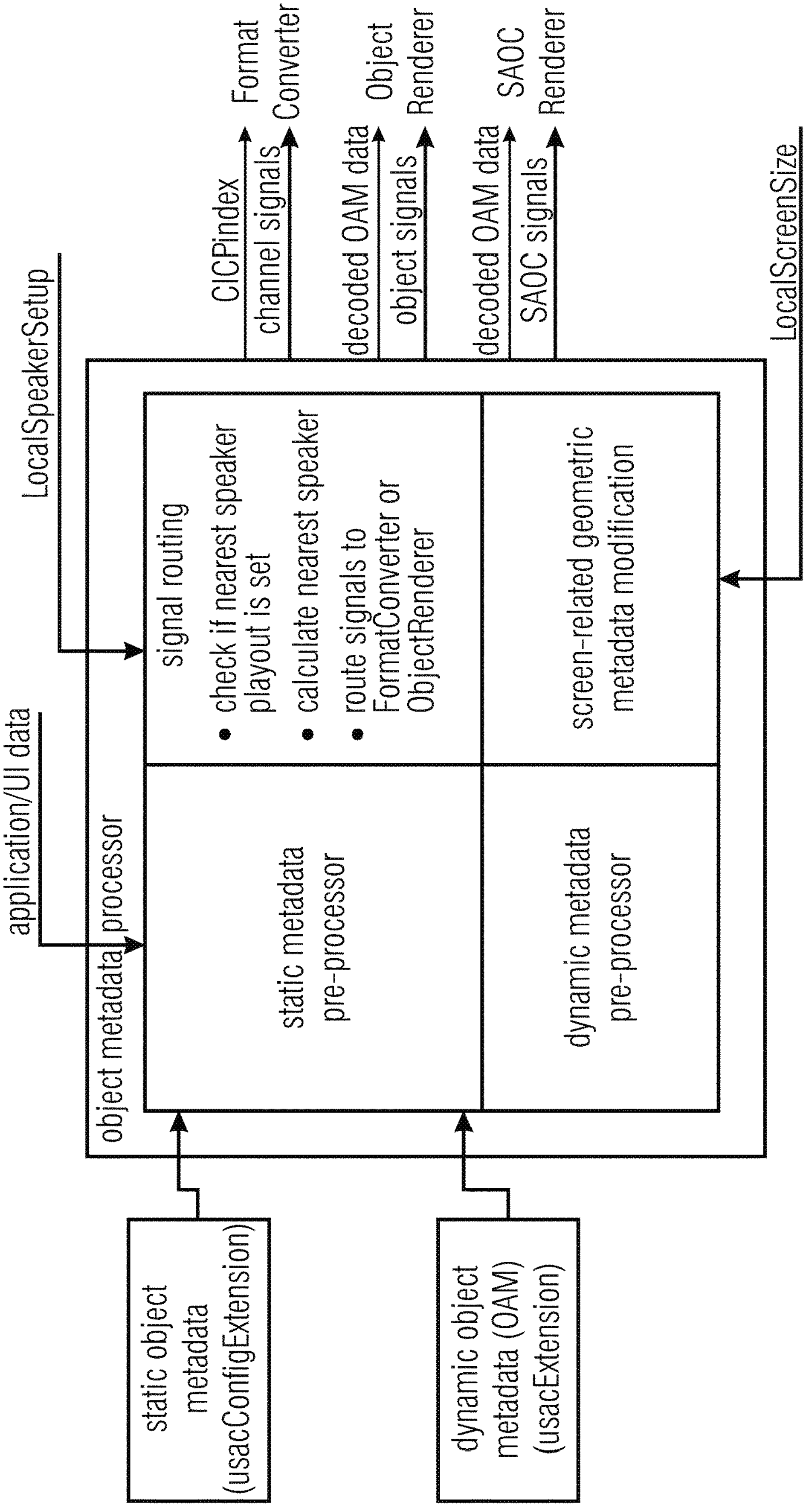
FIG. 3 illustrates an object metadata processor according to an embodiment.

FIG. 3 illustrates an object metadata processor according to an embodiment.

A strategy for distance calculation is described as follows:
- if closest loudspeaker metadata flag is set, sound is played back over the closest speaker
- to this end, the distance to next speakers is calculated (or read from a pre-stored table)
- solution with smallest distance is taken
- distance function can be, for instance (but not limited to):
  - weighted euclidian or great-arc distance
  - weighted absolute differences in azimuth and elevation angle
  - weighted absolute differences to the power p (p=2=>Least Squares Solution)

$$\Delta(P_1,P_2)=b\cdot|\beta_1-\beta_2|+a\cdot|\alpha_1-\alpha_2|+c\cdot|r_1-r_2|$$

An example concerns a closest loudspeaker calculation for binaural rendering.

If audio content should be played back as a binaural stereo signal over headphones or a stereo speaker setup, each channel of the audio content is traditionally mathematically combined with a binaural room impulse response or a head-related impulse response.

The measuring position of this impulse response has to correspond to the direction from which the audio content of the associated channel should be perceived. In multi-channel audio systems or object-based audio there is the case that the number of definable positions (either by a speaker or by an object position) is larger than the number of available impulse responses. In that case, an appropriate impulse response has to be chosen if there is no dedicated one available for the channel position or the object position. To inflict only minimum positional changes in the perception, the chosen impulse response should be the "geometrically nearest" impulse response.

It is in both cases needed to determine, which of the list of known positions (i.e. playback speakers or BRIRs) is the next to the wanted position (BRIR=Binaural Room Impulse Response). Therefore a "distance" between different positions has to be defined.

The distance between different positions is here defined as the absolute difference of their azimuth and elevation angles.

The following formula is used to calculate a distance of two positions $P_1,P_2$ in a coordinate system that is defined by elevation $\alpha$ and azimuth $\beta$:

$$\Delta(P_1,P_2)=|\beta_1-\beta_2|+|\alpha_1-\alpha_2|$$

It is possible to add the radius r as a third variable:

$$\Delta(P_1,P_2)=|\beta_1-\beta_2|+|\alpha_1-\alpha_2|+|r_1-r_2|$$

The nearest known position is the one, where the distance to the wanted position gets minimal $$P_{next}=\min(\Delta(P_{wanted},P_1),\Delta(P_{wanted},P_2), \ldots ,\Delta(P_{wanted},P_N))$$

In an embodiment, weights may, e.g., be added to elevation, azimuth and/or radius:

$$\Delta(P_1,P_2)=b\cdot|\beta_1-\beta_2|+a\cdot|\alpha_1-\alpha_2|+c\cdot|r_1-r_2|.$$

According to some embodiments, the closest speaker may, e.g., be determined as follows:

The distance of two positions $P_1$ and $P_2$ in a spherical coordinate system may, e.g., be defined as the absolute difference of their azimuth angles co and elevation angles $\theta$.

$$\Delta(P_1,P_2)=|\theta_1-\theta_2|+|\varphi_1-\varphi_2|$$

This distance has to be calculated for all known position $P_1$ to $P_N$ of the N output speakers with respect to the wanted position of the audio element Pwanted.

The nearest known loudspeaker position is the one, where the distance to the wanted position of the audio element gets minimal:

$$P_{next}=\min(\Delta(P_{wanted},P_1),\Delta(P_{wanted},P_2), \ldots ,\Delta(P_{wanted},P_N)).$$

For example, according to some embodiments, the closest speaker playout processing according to some embodiments may be conducted by determining the position of the closest existing loudspeaker for each member of the group of audio objects, if the ClosestSpeakerPlayout flag is equal to one.

The closest speaker playout processing may, e.g., be particularly meaningful for groups of elements with dynamic position data. The nearest known loudspeaker position may, e.g., be the one, where the distance to the desired/wanted position of the audio element gets minimal.

In the following, a system overview of a 3D audio codec system is provided. Embodiments of the present invention may be employed in such a 3D audio codec system. The 3D audio codec system may, e.g., be based on an MPEG-D USAC Codec for coding of channel and object signals.

According to embodiments, to increase the efficiency for coding a large amount of objects, MPEG SAOC technology has been adapted (SAOC=Spatial Audio Object Coding). For example, according to some embodiments, three types of renderers may, e.g., perform the tasks of rendering objects to channels, rendering channels to headphones or rendering channels to a different loudspeaker setup.

When object signals are explicitly transmitted or parametrically encoded using SAOC, the corresponding object metadata information is compressed and multiplexed into the 3D-audio bitstream.

Figure 4:
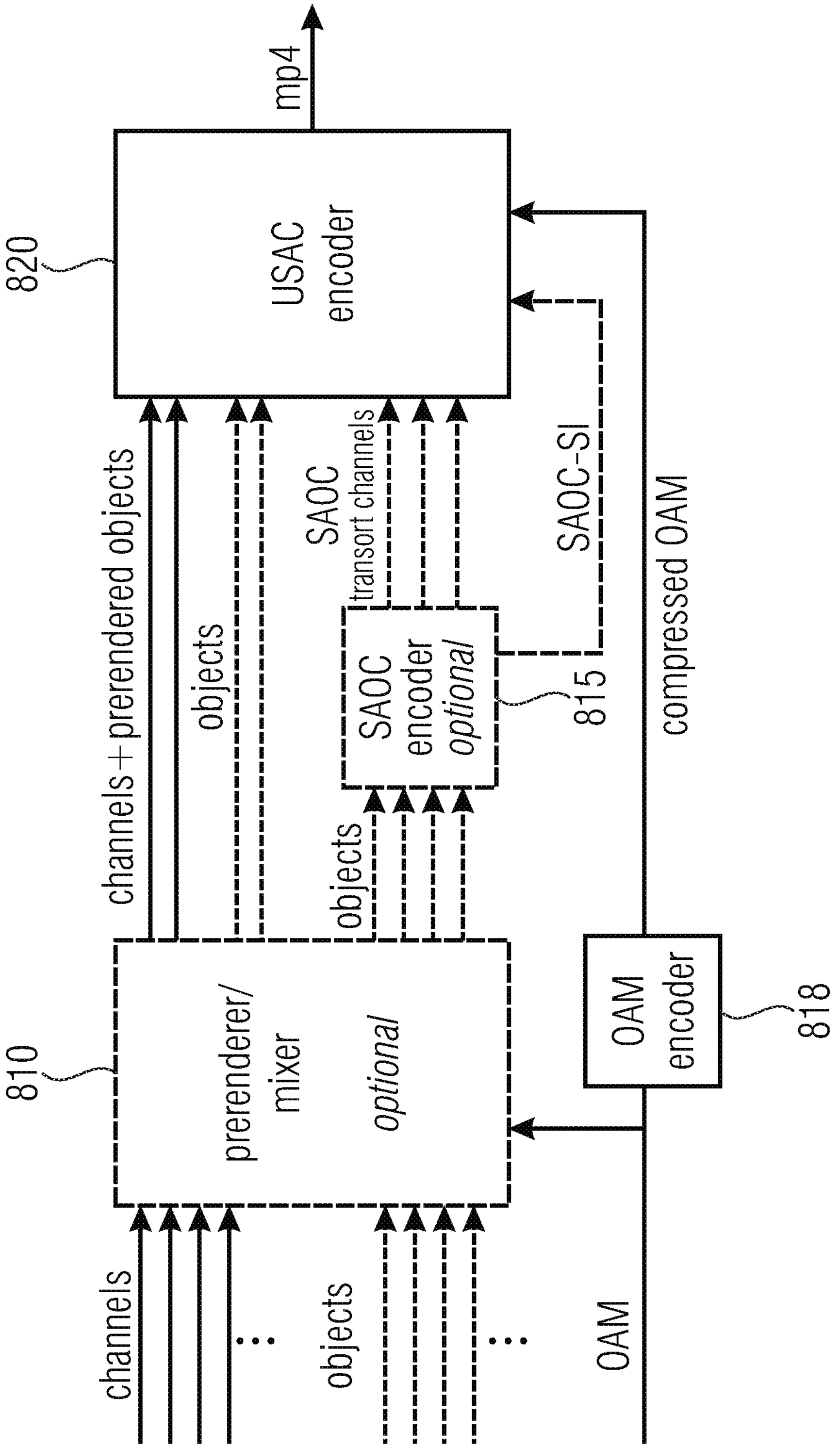
FIG. 4 illustrates an overview of a 3D-audio encoder.
Figure 5:
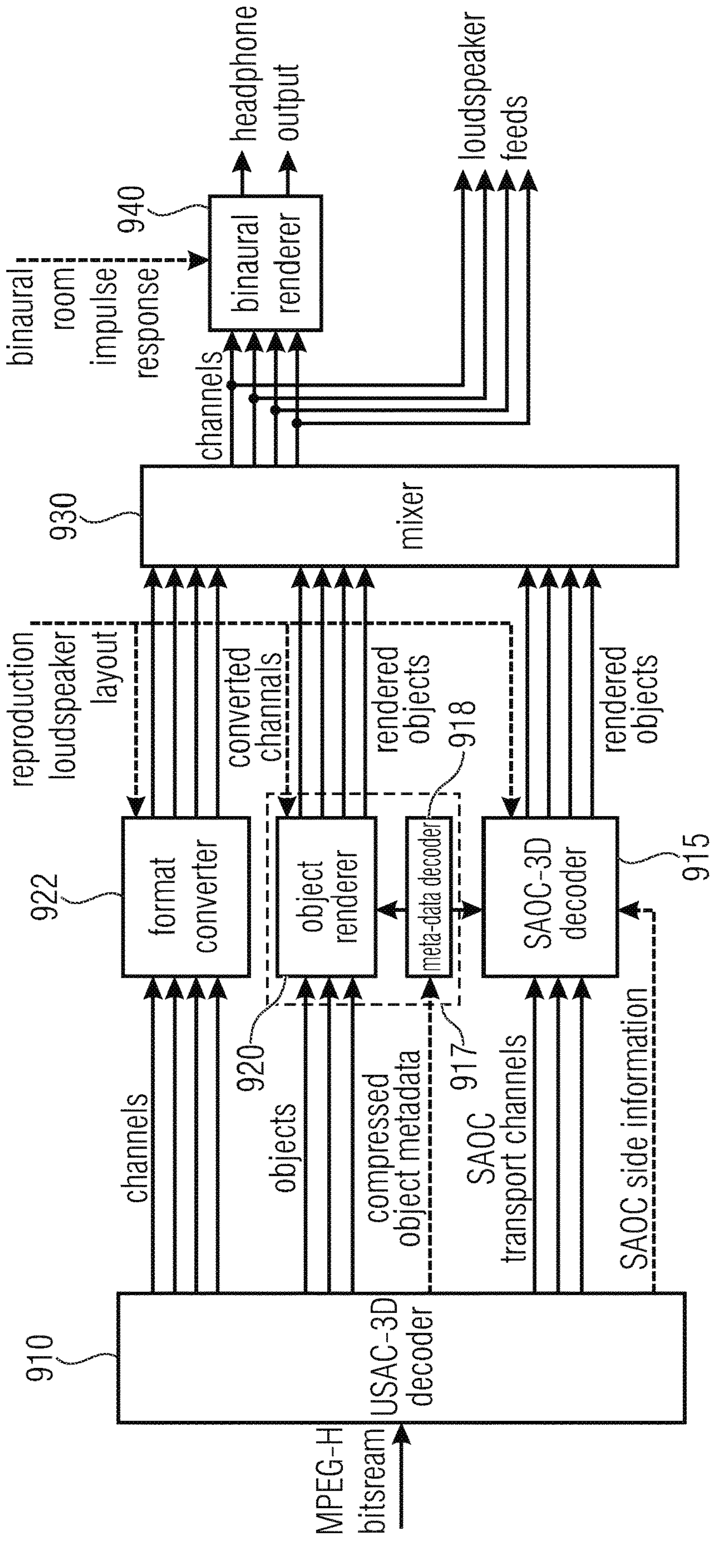
FIG. 5 illustrates an overview of a 3D-Audio decoder according to an embodiment.

FIG. 4 and FIG. 5 show the different algorithmic blocks of the 3D-Audio system. In particular, FIG. 4 illustrates an overview of a 3D-audio encoder. FIG. 5 illustrates an overview of a 3D-Audio decoder according to an embodiment.

Possible embodiments of the modules of FIG. 4 and FIG. 5 are now described.

In FIG. 4, a prerenderer 810 (also referred to as mixer) is illustrated. In the configuration of FIG. 4, the prerenderer 810 (mixer) is optional. The prerenderer 810 can be optionally used to convert a Channel+Object input scene into a channel scene before encoding. Functionally the prerenderer 810 on the encoder side may, e.g., be related to the functionality of object renderer/mixer 920 on the decoder side, which is described below. Prerendering of objects ensures a deterministic signal entropy at the encoder input that is basically independent of the number of simultaneously active object signals. With prerendering of objects, no object metadata transmission is required. Discrete Object Signals are rendered to the Channel Layout that the encoder is configured to use. The weights of the objects for each channel are obtained from the associated object metadata (OAM).

The core codec for loudspeaker-channel signals, discrete object signals, object downmix signals and pre-rendered signals is based on MPEG-D USAC technology (USAC Core Codec). The USAC encoder 820 (e.g., illustrated in FIG. 4) handles the coding of the multitude of signals by creating channel- and object mapping information based on the geometric and semantic information of the input's channel and object assignment. This mapping information describes, how input channels and objects are mapped to USAC-Channel Elements (CPEs, SCEs, LFEs) and the corresponding information is transmitted to the decoder.

All additional payloads like SAOC data or object metadata have been passed through extension elements and may, e.g., be considered in the USAC encoder's rate control.

The coding of objects is possible in different ways, depending on the rate/distortion requirements and the interactivity requirements for the renderer. The following object coding variants are possible:

- Prerendered objects: Object signals are prerendered and mixed to the 22.2 channel signals before encoding. The subsequent coding chain sees 22.2 channel signals.
- Discrete object waveforms: Objects are supplied as monophonic waveforms to the USAC encoder 820. The USAC encoder 820 uses single channel elements SCEs to transmit the objects in addition to the channel signals. The decoded objects are rendered and mixed at the receiver side. Compressed object metadata information is transmitted to the receiver/renderer alongside.
- Parametric object waveforms: Object properties and their relation to each other are described by means of SAOC parameters. The down-mix of the object signals is coded with USAC by the USAC encoder 820. The parametric information is transmitted alongside. The number of downmix channels is chosen depending on the number of objects and the overall data rate. Compressed object metadata information is transmitted to the SAOC renderer.

On the decoder side, a USAC decoder 910 conducts USAC decoding.

Moreover, according to embodiments, a decoder is provided, see FIG. 5. The decoder comprises a USAC decoder 910 for decoding a bitstream to obtain one or more audio input channels, to obtain one or more audio objects, to obtain compressed object metadata and to obtain one or more SAOC transport channels.

Furthermore, the decoder comprises an SAOC decoder 915 for decoding the one or more SAOC transport channels to obtain a first group of one or more rendered audio objects.

Furthermore, the decoder comprises a format converter 922 for converting the one or more audio input channels to obtain one or more converted channels.

Moreover, the decoder comprises a mixer 930 for mixing the audio objects of the first group of one or more rendered audio objects, the audio object of the second group of one or more rendered audio objects and the one or more converted channels to obtain one or more decoded audio channels.

In FIG. 5 a particular embodiment of a decoder is illustrated. The SAOC encoder 815 (the SAOC encoder 815 is optional, see FIG. 4) and the SAOC decoder 915 (see FIG. 5) for object signals are based on MPEG SAOC technology. The system is capable of recreating, modifying and rendering a number of audio objects based on a smaller number of transmitted channels and additional parametric data (OLDs, IOCs, DMGs) (OLD=object level difference, IOC=inter object correlation, DMG=downmix gain). The additional parametric data exhibits a significantly lower data rate than what may be used for transmitting all objects individually, making the coding very efficient.

The SAOC encoder 815 takes as input the object/channel signals as monophonic waveforms and outputs the parametric information (which is packed into the 3D-Audio bitstream) and the SAOC transport channels (which are encoded using single channel elements and transmitted).

The SAOC decoder 915 reconstructs the object/channel signals from the decoded SAOC transport channels and parametric information, and generates the output audio scene based on the reproduction layout, the decompressed object metadata information and optionally on the user interaction information.

Regarding object metadata codec, for each object, the associated metadata that specifies the geometrical position and spread of the object in 3D space is efficiently coded by quantization of the object properties in time and space, e.g., by the metadata encoder 818 of FIG. 4. The compressed object metadata cOAM (cOAM=compressed audio object metadata) is transmitted to the receiver as side information. At the receiver the cOAM is decoded by the metadata decoder 918.

For example, in FIG. 5, the metadata decoder 918 may, e.g., implement the distance calculator 110 of FIG. 1 according to one of the above-described embodiments.

An object renderer, e.g., object renderer 920 of FIG. 5, utilizes the compressed object metadata to generate object waveforms according to the given reproduction format. Each object is rendered to certain output channels according to its metadata. The output of this block results from the sum of the partial results. In some embodiments, if determination of the closest loudspeaker is conducted, the object renderer 920, may, for example, pass the audio objects, received from the USAC-3D decoder 910, without rendering them to the mixer 930. The mixer 930 may, for example, pass the audio objects to the loudspeaker that was determined by the distance calculator (e.g., implemented within the meta-data decoder 918) to the loudspeakers. By this according to an embodiment, the meta-data decoder 918 which may, e.g., comprise a distance calculator, the mixer 930 and, optionally, the object renderer 920 may together implement the apparatus 100 of FIG. 1.

For example, the meta-data decoder 918 comprises a distance calculator (not shown) and said distance calculator or the meta-data decoder 918 may signal, e.g., by a connection (not shown) to the mixer 930, the closest loudspeaker for each audio object of the one or more audio objects received from the USAC-3D decoder. The mixer 930 may then output the audio object within a loudspeaker channel only to the closest loudspeaker (determined by the distance calculator) of the plurality of loudspeakers.

In some other embodiments, the closest loudspeaker is only signaled for one or more of the audio objects by the distance calculator or the meta-data decoder 918 to the mixer 930.

If both channel based content as well as discrete/parametric objects are decoded, the channel based waveforms and the rendered object waveforms are mixed before outputting the resulting waveforms, e.g., by mixer 930 of FIG. 5 (or before feeding them to a postprocessor module like the binaural renderer or the loudspeaker renderer module).

A binaural renderer module 940, may, e.g., produce a binaural downmix of the multichannel audio material, such that each input channel is represented by a virtual sound source. The processing is conducted frame-wise in QMF domain. The binauralization may, e.g., be based on measured binaural room impulse responses.

A loudspeaker renderer 922 may, e.g., convert between the transmitted channel configuration and the desired reproduction format. It is thus called format converter 922 in the following. The format converter 922 performs conversions to lower numbers of output channels, e.g., it creates downmixes. The system automatically generates optimized downmix matrices for the given combination of input and output formats and applies these matrices in a downmix process. The format converter 922 allows for standard loudspeaker configurations as well as for random configurations with non-standard loudspeaker positions.

According to embodiments, a decoder device is provided. The decoder device comprises a USAC decoder 910 for decoding a bitstream to obtain one or more audio input channels, to obtain one or more input audio objects, to obtain compressed object metadata and to obtain one or more SAOC transport channels.

Moreover, the decoder device comprises an SAOC decoder 915 for decoding the one or more SAOC transport channels to obtain a group of one or more rendered audio objects.

Furthermore, the decoder device comprises an object metadata decoder 918 for decoding the compressed object metadata to obtain uncompressed metadata.

Moreover, the decoder device comprises a format converter 922 for converting the one or more audio input channels to obtain one or more converted channels.

Furthermore, the decoder device comprises a mixer 930 for mixing the one or more rendered audio objects of the group of one or more rendered audio objects, the one or more input audio objects and the one or more converted channels to obtain one or more decoded audio channels.

The object metadata decoder 918 and the mixer 930 together form an apparatus 100 according to one of the above-described embodiments, e.g., according to the embodiment of FIG. 1.

The object metadata decoder 918 comprises the distance calculator 110 of the apparatus 100 according to one of the above-described embodiments, wherein the distance calculator 110 is configured, for each input audio object of the one or more input audio objects, to calculate distances of the position associated with said input audio object to speakers or for reading the distances of the position associated with said input audio object to the speakers, and to take a solution with a smallest distance.

The mixer 930 is configured to output each input audio object of the one or more input audio objects within one of the one or more decoded audio channels to the speaker corresponding to the solution determined by the distance calculator 110 of the apparatus 100 according to one of the above-described embodiments for said input audio object.

In such embodiments, the object renderer 920 may, e.g., be optional. In some embodiments, the object renderer 920 may be present, but may only render input audio objects if metadata information indicates that a closest speaker playout is deactivated. If metadata information indicates that closest speaker playout is activated, then the object renderer 920 may, e.g., pass the input audio objects directly to the mixer without rendering the input audio objects.

Figure 6:
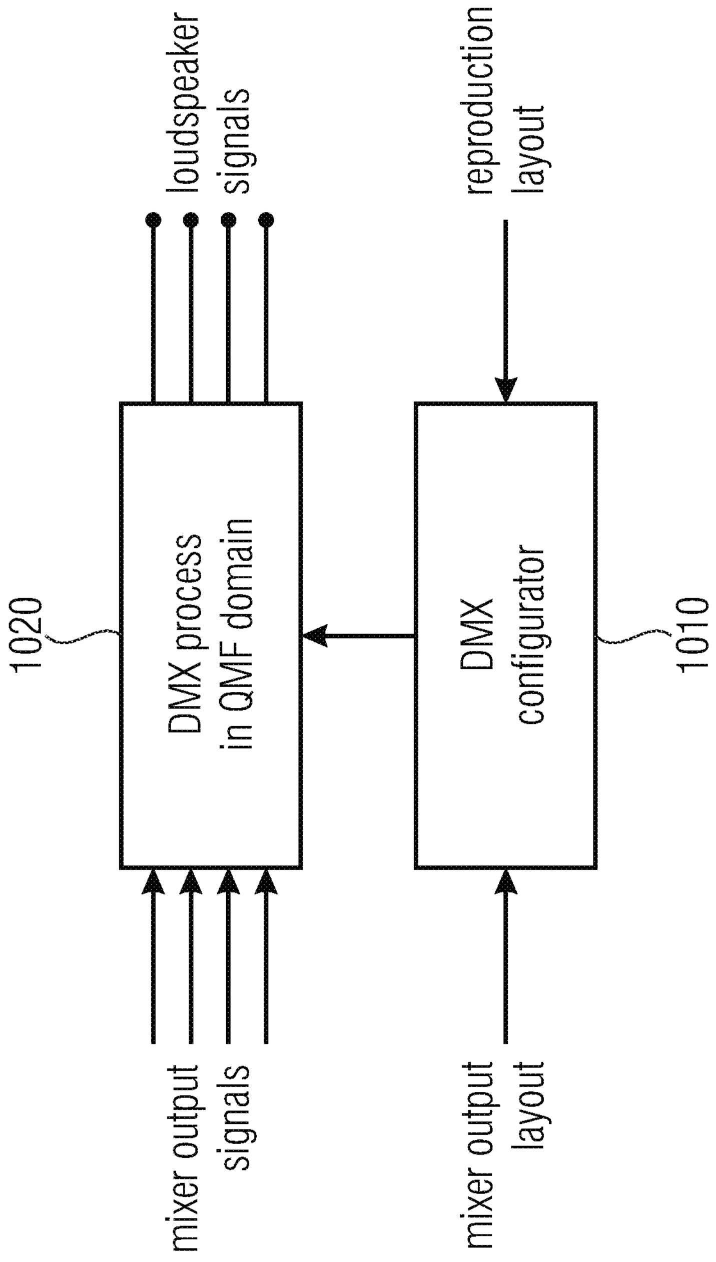
FIG. 6 illustrates a structure of a format converter.

FIG. 6 illustrates a structure of a format converter. FIG. 6 illustrates a downmix configurator 1010 and a downmix processor for processing the downmix in the QMF domain (QMF domain=quadrature mirror filter domain).

In the following, further embodiments and concepts of embodiments of the present invention are described.

In embodiments, the audio objects may, e.g., be rendered, e.g., by an object renderer, on the playback side using the metadata and information about the playback environment. Such information may, e.g., be the number of loudspeakers or the size of the screen. The object renderer may, e.g., calculate loudspeaker signals on the basis of the geometric data and the available speakers and their positions.

User control of objects may, e.g., be realized by descriptive metadata, e.g., by information about the existence of an object inside the bitstream and high-level properties of objects, or, may, e.g., be realized by restrictive metadata, e.g., information on how interaction is possible or enabled by the content creator.

According to embodiments, signaling, delivery and rendering of audio objects may, e.g., be realized by positional metadata, e.g., by structural metadata, for example, grouping and hierarchy of objects, e.g., by the ability to render to specific speaker and to signal channel content as objects, and, e.g., by means to adapt object scene to screen size.

Therefore, new metadata fields were developed in addition to the already defined geometrical position and level of the object in 3D space.

In general, the position of an object is defined by a position in 3D space that is indicated in the metadata.

This playback loudspeaker can be a specific speaker that exists in the local loudspeaker setup. In this case the wanted loudspeaker can be directly defined by the means of metadata.

Nevertheless, there are cases where the producer does not want the object content to be played-back by a specific speaker, but rather by the next available speaker, e.g., the "geometrically nearest" speaker. This allows for a discrete playback without the necessity to define which speaker corresponds to which audio signal. This is useful as the reproduction loudspeaker layout may be unknown to the producer, such that he might not know which speakers he can choose of.

Embodiments provides a simple definition of a distance function that does not need any square root operations or cos/sin functions. In embodiments, the distance function works in angular domain (azimuth, elevation, distance), so no transform to any other coordinate system (Cartesian, longitude/latitude) is needed. According to embodiments, there are weights in the function that provide a possibility to shift the focus between azimuth deviation, elevation deviation and radius deviation. The weights in the function might, e.g., be adjusted to the abilities of human hearing (e.g. adjust weights according to the just noticeable difference in azimuth and elevation direction). The function could not only be applied for the determination of the closest speaker, but also for choosing a binaural room impulse response or head-related impulse response for binaural rendering. No interpolation of impulse responses is needed in this case, instead the "closest" impulse response can be used.

According to an embodiment, a "ClosestSpeakerPlayout" flag called mae_closestSpeakerPlayout may, e.g., be defined in the object-based metadata that forces the sound to be played back by the nearest available loudspeaker without rendering. An object may, e.g., be marked for playback by the closest speaker if its "ClosestSpeakerPlayout" flag is set to one. The "ClosestSpeakerPlayout" flag may, e.g., be defined on a level of a "group" of objects. A group of objects is a concept of a gathering of related objects that should be rendered or modified as a union. If this flag is set to one, it is applicable for all members of the group.

According to embodiments, for determining the closest speaker, if the mae_closestSpeakerPlayout flag of a group, e.g., a group of audio objects, is enabled, the members of the group shall each be played back by the speaker that is nearest to the given position of the object. No rendering is applied. If the "ClosestSpeakerPlayout" is enabled for a group, then the following processing is conducted:

For each of the group members, the geometric position of the member is determined (from the dynamic object metadata (OAM)), and the closest speaker is determined, either by lookup in a pre-stored table or by calculation with help of a distance measure. The distance of the member's position to every (or only a subset) of the existing speakers is calculated. The speaker that yields the minimum distance is defined to be the closest speaker, and the member is routed to its closest speaker. The group members are played back each by its closest speaker.

As already described, the distance measures for the determination of the closest speaker may, for example, be implemented as:

- The weighted absolute differences in azimuth and elevation angle
- The weighted absolute differences in azimuth, elevation and radius/distance and for instance (but not limited to):
- The weighted absolute differences to the power p (p=2=>Least Squares Solution) (Weighted) Pythagorean Theorem/Euclidean Distance The distance d for Cartesian coordinates may, e.g., be realized by employing the formula $$d=\sqrt{(x_1-x_2)^2+(y_1-y_2)^2+(z_1-z_2)^2}$$

with $x_1$, $y_1$, $z_1$ being the x-, y- and z-coordinate values of a first position, with $x_2$, $y_2$, $z_2$ being the x-, y- and z-coordinate values of a second position, and with d being the distance between the first and the second position.

A distance measure d for polar coordinates may, e.g., be realized by employing the formula:

$$d=\sqrt{a\cdot(x_1-x_2)^2+b\cdot(y_1-y_2)^2+c\cdot(z_1-z_2)^2}.$$

with $\alpha_1$, $\beta_1$ and $r_1$ being the polar coordinates of a first position, with $\alpha_2$, $\beta_2$ and $r_2$ being the polar coordinates of a second position, and with d being the distance between the first and the second position.

The weighted angular difference may, e.g., be defined according to $$\mathrm{diffAngle}=a\cos(\cos(\alpha_1-\alpha_2)\cdot\cos(\beta_1-\beta_2))$$

Regarding the orthodromic distance, the Great-Arc Distance, or the Great-Circle Distance, the distance measured along the surface of a sphere (as opposed to a straight line through the sphere's interior). Square root operations and trigonometric functions may, e.g., be employed. Coordinates may, e.g., be transformed to latitude and longitude.

Returning to the formula presented above:

$$\Delta(P_1,P_2)=|\beta_1-\beta_2|+|\alpha_1-\alpha_2|+|r_1-r_2|,$$

the formula can be seen as a modified Taxicab geometry using polar coordinates instead of Cartesian coordinates as in the original taxicab geometry definition $$\Delta(P_1,P_2)=|x_1-x_2|+|y_1-y_2|.$$

With this formula, it is possible to add weights to elevation, azimuth and/or radius. In that way it is possible to state that an azimuth deviation should be less tolerable than an elevation deviation by weighting the azimuth deviation by a high number:

$$\Delta(P_1,P_2)=b\cdot|\beta_1-\beta_2|+\alpha\cdot|\alpha_1-\alpha_2|+c\cdot|r_1-r_2|.$$

As a further side remark, it should be noted, that in embodiments, the "rendered object audio" of FIG. 2 may, e.g., be considered as "rendered object-based audio". In FIG. 2, the usacConfigExtention regarding static object metadata and the usacExtension are only used as examples of particular embodiments.

Regarding FIG. 3. It should be noted that in some embodiments, the dynamic object metadata of FIG. 3 may, e.g., positional OAM (audio object metadata, positional data+ gain). In some embodiments, the "route signals" may, e.g., be conducted by routing signals to a format converter or to an object renderer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] "System and Method for Adaptive Audio Signal Generation, Coding and Rendering", Patent application number: US20140133683 A1 (Claim 48)

[2] "Reflected sound rendering for object-based audio", Patent application number: WO2014036085 A1 (Chapter Playback Applications)

[3] "Upmixing object based audio", Patent application number: US20140133682 A1 (BRIEF DESCRIPTION OF EXEMPLARY EMBODIMENTS+Claim 71 b))

[4] "Audio Definition Model", EBU-TECH 3364, https://tech.ebu.ch/docs/tech/tech3364.pdf

[5] "System and Tools for Enhanced 3D Audio Authoring and Rendering", Patent application number: US20140119581 A1

The invention claimed is:

1. An apparatus for playing back an audio object associated with a position, comprising:

a distance calculator for determining a solution with a smallest distance of distances of the position to speakers, wherein the apparatus is configured to play back the audio object using the speaker corresponding to the solution, wherein the apparatus is configured to calculate the distances depending on a function which depends on one or more angular differences between the position of the audio object and a speaker position.

2. The apparatus according to claim 1, wherein the distance calculator is configured to calculate the distances of the position to the speakers or to read the distances of the position to the speakers only if a closest speaker playout flag, being received by the apparatus, is enabled, wherein the distance calculator is configured to take a solution with a smallest distance only if the closest speaker playout flag is enabled, and wherein the apparatus is configured to play back the audio object using the speaker corresponding to the solution only of the closest speaker playout flag is enabled.

3. The apparatus according to claim 2, wherein the apparatus is configured to not conduct any rendering on the audio object, if the closest speaker playout flag is enabled.

4. The apparatus according to claim 1, wherein the distance calculator is configured to calculate the distances depending on a distance function which returns a weighted Euclidian distance or a great-arc distance.

5. The apparatus according to claim 1, wherein the distance calculator is configured to calculate the distances depending on a distance function which returns weighted absolute differences in azimuth and elevation angles.

6. The apparatus according to claim 1, wherein the distance calculator is configured to calculate the distances depending on a distance function which returns weighted absolute differences to the power p, wherein p is a number.

7. The apparatus according to claim 1, wherein the distance calculator is configured to calculate the distances depending on a distance function which returns a weighted angular difference.

8. The apparatus according to claim 7, wherein the distance function is defined according to $$\text{diffAngle}=a\ \cos(\cos(\text{azDiff})*\cos(\text{elDiff})),$$

wherein azDiff indicates a difference of two azimuth angles, wherein elDiff indicates a difference of two elevation angles, and wherein diffAngle indicates the weighted angular difference.

9. The apparatus according to claim 1, wherein the distance calculator is configured to calculate the distances of the position to the speakers, so that each distance $\Delta(P_1,P_2)=|\beta_1-\beta_2|+||\alpha_1-\alpha_2|+|r_1-r_2|$ of the position to one of the speakers is calculated according to $$\Delta(P_1,P_2)=|\beta_1-\beta_2|+\alpha_1-\alpha_2|$$

wherein $\alpha_1$ indicates an azimuth angle of the position, $\alpha_2$ indicates an azimuth angle of said one of the speakers, $\beta_1$ indicates an elevation angle of the position, and $\beta_2$ indicates an elevation angle of said one of the speakers, or wherein $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position.

10. The apparatus according to claim 1, wherein the distance calculator is configured to calculate the distances of the position to the speakers, so that each distance $\Delta(P_1, P_2)=|\beta_1-\delta\beta_2|+|\alpha_1-\alpha_2|+|r_1-r_2|$ of the position to one of the speakers is calculated according to $$\Delta(P_1,P_2)=|\beta_1-\beta_2|+|\alpha_1-\alpha_2|+r_1-r_2|$$

wherein $\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position and $r_2$ indicates a radius of said one of the speakers, or wherein $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, $r_1$ indicates a radius of said one of the speakers and $r_2$ indicates a radius of the position.

11. The apparatus according to claim 1, wherein the distance calculator is configured to calculate the distances of the position to the speakers, so that each distance $\Delta(P_1, P_2)=|\beta_1-\beta_2|+|\alpha_1-\alpha_2|+|r_1-r_2|$ of the position to one of the speakers is calculated according to $$\Delta(P_1,P_2)=b\cdot|\beta_1-\beta_2|+\alpha\cdot|\alpha_1-\alpha_2|$$

wherein $\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, a is a first number, and b is a second number, or wherein $\alpha_1$ indicates an azimuth angle of said one of the speakers, $\alpha_2$ indicates an azimuth angle of the position, $\beta_1$ indicates an elevation angle of said one of the speakers, $\beta_2$ indicates an elevation angle of the position, a is a first number, and b is a second number.

12. The apparatus according to claim 1, wherein the distance calculator is configured to calculate the distances of the position to the speakers, so that each distance $\Delta(P_1, P_2)=|\beta_1-\beta_2|+|\alpha_1-\alpha_2|+|r_1-r_2|$ of the position to one of the speakers is calculated according to $$\Delta(P_1,P_2)=b\cdot|\beta_1\beta_2|+\alpha\cdot\alpha_1-\alpha_2|+c\cdot|r_1-r_2|$$

wherein $\alpha_1$ indicates an azimuth angle of the position, $\alpha_2$ indicates an azimuth angle of said one of the speakers, $\beta_1$ indicates an elevation angle of the position, $\beta_2$ indicates an elevation angle of said one of the speakers, $r_1$ indicates a radius of the position, $r_2$ indicates a radius of said one of the speakers, a is a first number, b is a second number, and c is a third number, or wherein $\alpha_1$ indicates an azimuth angle of said one of the speakers, $\alpha_2$ indicates an azimuth angle of the position, $\beta_1$ indicates an elevation angle of said one of the speakers, and $\beta_2$ indicates an elevation angle of the position, $r_1$ indicates a radius of said one of the speakers, and $r_2$ indicates a radius of the position, a is a first number, b is a second number, and c is a third number.

13. A decoder device comprising:

a USAC decoder for decoding a bitstream to acquire one or more audio input channels, to acquire one or more input audio objects, to acquire compressed object metadata and to acquire one or more SAOC transport channels, an SAOC decoder for decoding the one or more SAOC transport channels to acquire a group of one or more rendered audio objects, an object metadata decoder, for decoding the compressed object metadata to acquire uncompressed metadata, a format converter for converting the one or more audio input channels to acquire one or more converted channels, and a mixer for mixing the one or more rendered audio objects of the group of one or more rendered audio objects, the one or more input audio objects and the one or more converted channels to acquire one or more decoded audio channels, wherein the object metadata decoder and the mixer together form an apparatus according to one of the preceding claims, wherein the object metadata decoder comprises the distance calculator of the apparatus according to one of the preceding claims, wherein the distance calculator is configured, for each input audio object of the one or more input audio objects, to calculate distances of the position associated with said input audio object to speakers or for reading the distances of the position associated with said input audio object to the speakers, and to take a solution with a smallest distance, and wherein the mixer is configured to output each input audio object of the one or more input audio objects within one of the one or more decoded audio channels to the speaker corresponding to the solution determined by the distance calculator of the apparatus according to one of the preceding claims for said input audio object.

14. A method for playing back an audio object associated with a position, comprising:

determining a solution with a smallest distance of distances of the position to speakers, and playing back the audio object using the speaker corresponding to the solution, wherein the method comprises calculating the distances depending on a function which depends on one or more angular differences between the position of the audio object and a speaker position.

15. A non-transitory digital storage medium having a computer program stored thereon to perform the method for playing back an audio object associated with a position, comprising:

determining a solution with a smallest distance of distances of the position to speakers, and playing back the audio object using the speaker corresponding to the solution, when said computer program is run by a computer, wherein the method comprises calculating the distances depending on a function which depends on one or more angular differences between the position of the audio object and a speaker position.

* * * * *